(12) United States Patent
Koenig et al.

(10) Patent No.: US 11,108,292 B2
(45) Date of Patent: Aug. 31, 2021

(54) INVERTER DRIVEN MOTOR WINDING LIFE EXTENSION

(71) Applicant: Hamilton Sundstrand Corporation, Charlotte, NC (US)

(72) Inventors: Andreas C. Koenig, Rockford, IL (US); Joseph Kenneth Coldwate, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 290 days.

(21) Appl. No.: 16/176,996

(22) Filed: Oct. 31, 2018

(65) Prior Publication Data

US 2020/0136454 A1 Apr. 30, 2020

(51) Int. Cl.
*H02K 3/28* (2006.01)
*H02P 25/18* (2006.01)
*H02P 25/22* (2006.01)

(52) U.S. Cl.
CPC ............... *H02K 3/28* (2013.01); *H02P 25/18* (2013.01); *H02P 25/22* (2013.01)

(58) Field of Classification Search
CPC . H02P 25/18; H02P 6/08; H02P 25/22; H02K 3/28
See application file for complete search history.

(56) References Cited

U.S. PATENT DOCUMENTS 5,285,124 A * 2/1994 Satake .................... H02K 19/14
310/114
5,821,660 A 10/1998 Anderson
6,573,681 B2 6/2003 Schwesig
8,810,189 B2 * 8/2014 Singh ...................... G01R 31/42
318/801
9,677,531 B2 6/2017 Ramamoorthy
2014/0368093 A1 * 12/2014 Valenti .................... H02P 25/18
310/68 B
2018/0175757 A1 * 6/2018 Tanimoto .................. H02P 4/00
(Continued)

FOREIGN PATENT DOCUMENTS

EP 2595310 A1 5/2013
GB 2175157 A 11/1986
WO 2017150639 A1 8/2017

OTHER PUBLICATIONS

European Search Report for Application No. 19206275.0-1202, dated Feb. 12, 2020, 8 pages.

*Primary Examiner* — Bickey Dhakal
(74) *Attorney, Agent, or Firm* — Cantor Colburn LLP

(57) ABSTRACT

An electric motor control system including an electric motor having a winding with a first and second end, a motor controller having a phase lead, the motor controller operable to direct a phase current to the phase lead. The electric motor control system also includes a first switching device that provides an electrical connection between the phase lead and the first end of the first winding when in a disabled state, and thereby flowing the phase current from the phase lead to the first end of the first winding, and a second switching device operably connected to the motor controller and providing an electrical connection between the second end of the first winding and a common point, when in an enabled state. The motor controller is operable to change the state of the first switching device to enabled, and the second switching device to disabled, under selected conditions.

19 Claims, 4 Drawing Sheets

(56) References Cited

U.S. PATENT DOCUMENTS

| | | | | |
|---|---|---|---|---|
| 2018/0375457 A1* | 12/2018 | Kitamura | ................ | H02M 1/32 |
| 2019/0077449 A1* | 3/2019 | Wada | ................... | B62D 5/0481 |
| 2020/0186075 A1* | 6/2020 | Koikegami | .......... | B62D 5/0484 |

* cited by examiner

INVERTER DRIVEN MOTOR WINDING LIFE EXTENSION

BACKGROUND

Exemplary embodiments pertain to the art of electric machines, and more particularly addressing the impact of high voltage spikes on motor winding sets for electric machine.

Electric motors are commonly used to convert electrical power into mechanical power to operate various devices on aircraft. For example, 'more electric' aircraft architectures increasingly employ growing numbers of alternating current (AC) electric motors to operate devices traditionally powered hydraulically. Electric motors commonly aid in reducing weight and simplifying the arrangement of the aircraft. Such electric motors typically employ three-phase AC windings, which are provided AC power by the aircraft electrical system, and may operate at frequency in cooperation with a motor controller.

For conventional three phase electric motors driven by power electronic inverters, high voltage, high rates of change can occur with the commands provided to the electric motors at the motor windings. This high voltage rate of change, sometimes known as high dv/dt, can include large, short duration voltage spikes, which when applied to the motor have a deleterious impact on the motor windings, causing insulation degradation, and eventual failure of the winding. More particularly, based on the particular construction of the motor windings, the voltage spikes have the most significant impact on the first few turns of the motor windings. These voltage spikes can lead to insulation breakdown, arcing and eventual failure of the insulation and winding in the motor, rendering it inoperable.

In some instances, the high dv/dt can be compensated for by employing filtering, snubbers (e.g., inductors), and the like, in a conventional manner. In other instances, inverter control signals generated by the motor controller may be modified to reduce the dv/dt spikes and transients as applied to the electric motor. Unfortunately, such approaches may result in secondary effects, such as reduced performance by the motor, and increased switching losses in the inverter components. Such conventional methods and systems have generally been considered satisfactory for their intended purpose. However, there is still a need in the art for improved yet simple technique to extend motor life in inverter driven electric motors.

BRIEF DESCRIPTION

Disclosed herein is an electric motor control system including an electric motor having a winding with a first and second end, a motor controller having a phase lead, the motor controller operable to direct a phase current to the phase lead. The electric motor control system also includes a first switching device that provides an electrical connection between the phase lead and the first end of the first winding when in a disabled state, and thereby flowing the phase current from the phase lead to the first end of the first winding, and a second switching device operably connected to the motor controller and providing an electrical connection between the second end of the first winding and a common point, when in an enabled state. The motor controller is operable to change the state of the first switching device to enabled, and the second switching device to disabled, under selected conditions.

In addition to one or more of the features described above, or as an alternative, further embodiments of the system may include that the first switching device provides an electrical connection between the first end of the first winding and a first common point when in a enabled state, and the a second switching device and provides an electrical connection between the second end of the first winding and a first phase lead when in a disabled state, and thereby flowing the phase current from the first phase lead to the second end of the first winding.

In addition to one or more of the features described above, or as an alternative, further embodiments of the system may include that the electric motor is a multiphase electric machine and the phase lead corresponds to a first phase of a plurality of phases.

In addition to one or more of the features described above, or as an alternative, further embodiments of the system may include that the motor controller has a second phase lead corresponding to a second phase of the plurality of phases, the second phase lead operable to carry a second phase current.

In addition to one or more of the features described above, or as an alternative, further embodiments of the system may include that the motor having a second winding having a first end and a second end.

In addition to one or more of the features described above, or as an alternative, further embodiments of the system may include that the first switching device provides an electrical connection between the second phase lead and the first end of the second winding when in a disabled state, and thereby flowing the phase current from the second phase lead to the second end of the first winding, and the second switching device providing an electrical connection between the second end of the second winding and the second common point when in an enabled state, and the first switching device provides an electrical connection between the first end of the second winding and a first common point when in a enabled state, and the a second switching device provides an electrical connection between the second end of the second winding and a second phase lead when in a disabled state, and thereby flowing the phase current from the second phase lead to the second end of the second winding.

In addition to one or more of the features described above, or as an alternative, further embodiments of the system may include that the motor controller includes an inverter.

In addition to one or more of the features described above, or as an alternative, further embodiments of the system may include that at least one of the first switching device and the second switching device is a multipole-double throw relay or contactor.

In addition to one or more of the features described above, or as an alternative, further embodiments of the system may include a first current sensor operably connected to the first phase lead, the current sensor operable to measure the first phase current.

In addition to one or more of the features described above, or as an alternative, further embodiments of the system may include that the selected conditions include stress on the first motor winding.

In addition to one or more of the features described above, or as an alternative, further embodiments of the system may include that the stress on the first motor winding is based on at least one of: a mission profile, a duration of time, the phase current, a voltage applied to the first winding, a dv/dt of the voltage applied to the first winding, a dv/dt over time, and a voltage in an inverter of the motor controller.

Also described herein, in another embodiment is a method extending winding life in an electric motor driven by an inverter. The method includes directing, by a motor controller, a first phase current through a first end of a first winding of the electric motor, and connecting a second end of the first winding to a second common point, and re-directing, by a motor controller, the first phase current through the second end of a first winding of the electric motor and connecting the first end of the first winding to a first common point, under selected conditions.

In addition to one or more of the features described above, or as an alternative, further embodiments of the method may include that the electric motor is a multiphase electric machine and the phase lead corresponds to a first phase of a plurality of phases.

In addition to one or more of the features described above, or as an alternative, further embodiments of the method may include directing, by a motor controller, a second phase current through a first end of a second winding of the electric motor, and connecting a second end of the second winding to the second common point.

In addition to one or more of the features described above, or as an alternative, further embodiments of the method may include directing, by a motor controller, the second phase current through the second end of a second winding of the electric motor and connecting the first end of the second winding to the first common point if the stress determined exceeds the first selected threshold.

In addition to one or more of the features described above, or as an alternative, further embodiments of the method may include measuring the first phase current with a first current sensor operably connected to the first phase lead, the current sensor operable to provide a first phase current signal to the motor controller.

In addition to one or more of the features described above, or as an alternative, further embodiments of the method may include that the selected conditions include a stress on the first winding of the motor.

In addition to one or more of the features described above, or as an alternative, further embodiments of the method may include determining a stress on the first winding associated with the first phase current, and determining if the stress exceeds a first selected threshold, wherein the redirecting is based on the stress exceeding the selected threshold.

In addition to one or more of the features described above, or as an alternative, further embodiments of the method may include that the stress on the first motor winding is based on at least one of: a mission profile, a duration of time, the phase current, a voltage applied to the first winding, a dv/dt of the voltage applied to the first winding, a dv/dt over time, and a voltage in an inverter of the motor controller.

In addition to one or more of the features described above, or as an alternative, further embodiments of the method may include that the stress is based on the duration in the phase current is applied to the first winding.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
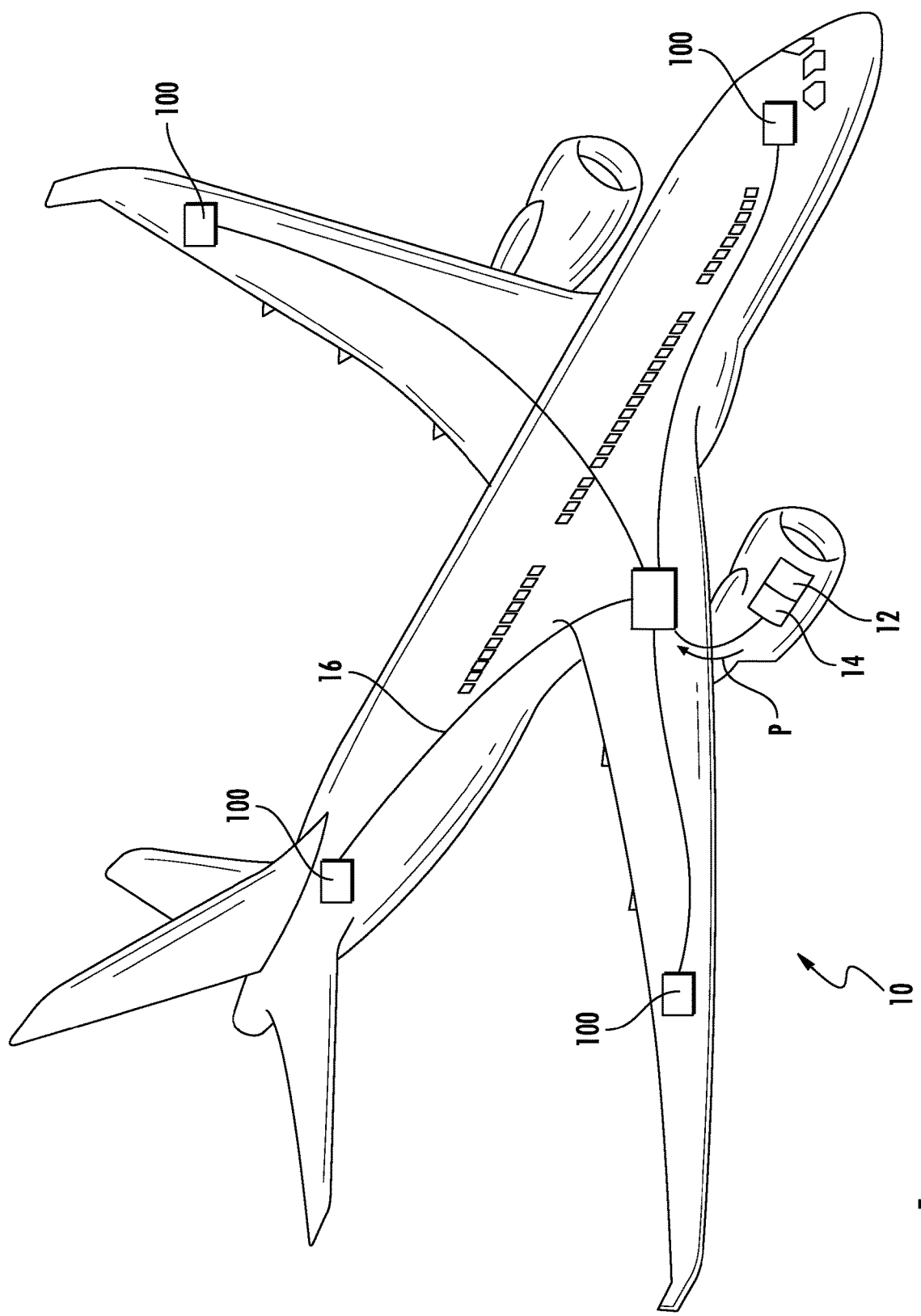
FIG. 1 is a diagram, showing an aircraft power distribution system in communication with an electric machine.

A detailed description of one or more embodiments of the disclosed apparatus and method are presented herein by way of exemplification and not limitation with reference to the Figures wherein like reference numerals identify similar structural features or aspects of the subject disclosure.

For purposes of explanation and illustration, and not limitation, a partial view of an exemplary embodiment of an electric machine in its application is shown in FIG. 1 and is designated generally by reference character 100. Other embodiments of electric machine and methods of limiting high dv/dt voltages spike impact on the motor windings in accordance with the disclosure, or aspects thereof, are provided in FIGS. 2-4, as will be described herein. The systems and methods described herein can be used to modify the application of power to winding sets in electric machine in aircraft, though the present disclosure is not limited to aircraft or to electric machines with parallel windings.

As will be appreciated by those of skill in the art in view of the present disclosure, inverter driven motors can exhibit high dv/dt voltage spikes being applied to the motor windings. The application of these voltages to the winding in the same way repeatedly places a disproportionate degrading effect on the first few turns of the motor winding and as a result can compromise the health of the electric machine. The described embodiments address this localized impact by selectively changing the application of voltages and currents in an inverter driven application of electric machine and thereby reducing the overall impact of dv/dt voltage spikes resultant from the inverter to reduce motor winding degradation and thereby improve motor longevity.

Figure 2:
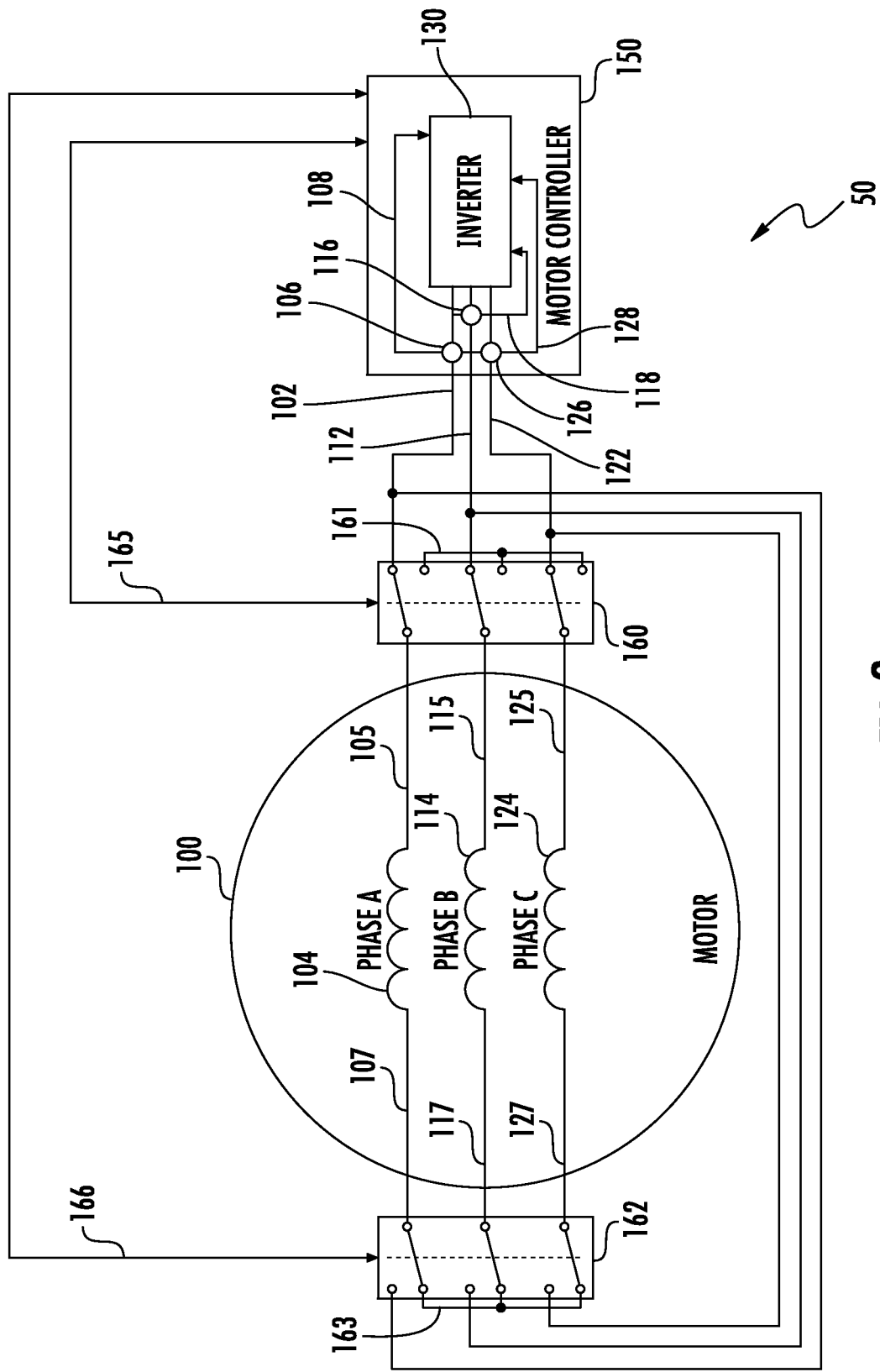
FIG. 2 is a schematic view of an embodiment of the electric machine of FIG. 1, showing current sensors coupled to winding sets of the electric machine within an motor controller.

Referring to FIG. 1, an aircraft 10 is shown. The aircraft 10 includes an engine 12, a generator electric machine 14, a power distribution system 16, and a motor 100, e.g., a motor electric machine. The engine 12 is operably connected to generator electric machine 14. Generator electric machine 14 is arranged to generate electrical power P using mechanical power received from engine 12. The power is provided to power distribution system 16, which connects the generator electric machine 14 to the motor 100 and provides the electrical power P thereto. With reference to FIG. 2, a motor control system 50 is shown. The motor control system 50 includes the motor 100 and motor controller 150. The motor control system 50 also includes a first switching mechanism 160 and a second switching mechanism 162 as will be described further herein. The motor controller 150 includes a first phase lead 102, operably connected to a first winding 104 of the motor 100. The motor controller 150 also includes a second phase lead 112 operably connected to a second winding 114 of the motor 100. Finally, the motor 100 includes a third phase lead 122 operably connected to a third winding 124 of the motor 100.

In the illustrated embodiment the phase lead 102 is an A-phase lead and the first winding 104 is an A-phase winding. Likewise, the phase lead 112 is a B-phase lead and the second winding 114 is a B-phase winding. Finally, the phase lead 122 is a C-phase lead and the third winding 124 is a C-phase winding. The A-phase lead 102 is connected to an inverter 130, which is arranged to provide AC power to the A-phase lead 102. Similarly, the B-phase lead 112 is connected to the inverter 130, which is arranged to provide AC power to the B-phase lead 112. Finally the C-phase lead 122 is connected to the inverter 130, which is arranged to provide AC power to the C-phase lead 122. The A-phase lead 102 is inductively coupled to, an A-phase current sensor 106, which is communicatively coupled with the motor controller 150. The A-phase current sensor 106 provides an A-phase current signal 108 to the motor controller 150. The B-phase lead 112 is inductively coupled to a B-phase current sensor 116, which is communicatively coupled with the motor controller 150. The B-phase current sensor 116 provides a B-phase current signal 118 to the motor controller 150. The C-phase lead 122 is inductively coupled to a C-phase current sensor 126, which is communicatively coupled with the motor controller 150. The C-phase current sensor 126 provides a C-phase current signal 128 to the motor controller 150.

Continuing with FIG. 2, as shown in the illustrated embodiment, the motor 100 is a three-phase AC powered electric motor operably connected with the motor controller 150 via the two switching devices, first switching device 160 and second switching device 162. In an embodiment, the first and the second switching devices 160, 162 are depicted as triple pole, double throw switching devices. However, other configurations, arrangements and architectures for the switching devices 160, 162 and their interconnection with the motor 100 and the motor controller 150 are possible. For example, the switching device 160, 162 could be configured as three separate double pole devices individually, but collectively controlled. Further, the first and second switching devices 160, 162 could be electromechanical such as relays, contactors, and the like, or semiconductor devices such as all varieties of transistors, triacs, thyristors, and the like. In an embodiment the first switching device 160 is operably connected to the motor controller 150 and responsive to a command signal 165 provided by the motor controller 150 as described further herein. Likewise, the second switching device 162 is operably connected to the motor controller 150 and responsive to a second command signal 166 provided by the motor controller 150 as described further herein.

In an embodiment, the switching devices 160, 162 operate to provide connectivity between each of the phase leads 102, 112, and 122 of the motor controller 150 with alternating ends of the motor windings 104, 114, and 124 respectively. That is, in a first instance, the switching device 160 is not commanded/enabled via command signal 165 by the motor controller 150 and is de-energized in a first, normally closed, position, and the second switching device 162 is commanded/enabled, and is energized via command signal 166 connected to its normally open, or second position. In this instance, the A-phase lead 102 is connected with a first end denoted as 105 of the A-phase winding 104, while connecting a second end 107 is connected to a second common point 163. In addition, connecting the B-phase lead 112 with a first end denoted as 115 of the B-phase winding 114, while connecting a second end 117 to the second common point 163. Finally, connecting the C-phase lead 122 with a first end denoted as 125 of the C-phase winding 124, while connecting a second end 127 to the second common point 163. In this manner, currents are able to flow from each of the respective phase leads 102, 104, and 106, through each of the three poles of the first switching device 160 respectively to each of the motor windings 104, 114, and 124, through each of the three poles of the second switching device 162 to the second common point 163 and returning to the motor controller 150 through the motor windings 104, 114, and 124 and the first switching device 160.

Alternately, in a second instance, the switching devices 160 and 162 are in their alternate positions. That is, the motor controller 150 as activated command signal 165 to the first switching device 160, which is energized, in a second, or normally open position. At the same time, the command signal 166 to the second switching device 162 is inactive and the second switching device 162 is de-energized, connected to its normally closed position. In this instance, the A-phase lead 102 is connected via the second switching device 162 to the second end 107 of the A-phase winding 104, while connecting a first end 105 of the A-phase winding 104 to a first common point 161. In addition, the B-phase lead 112 is connected via the second switching device 162 with the second end 117 of the B-phase winding 114, while connecting a first end 115 to the first common point 161. Finally, the C-phase lead 122 is connected via the second switching device 162 with a second end 127 of the C-phase winding 124, while connecting a first end 125 of the C-phase winding 124 to the first common point 161. Likewise, in this manner, currents are able to flow from each of the phase leads 102, 112, and 122, through each of the three poles of the second switching device 162 respectively, to each of the motor windings 104, 114, and 124 respectively and through each of the three poles of the first switching device 160 to the first common point 161 and returning to the motor controller 150 through the motor windings 104, 114, and 124 and the second switching device 162.

Figure 3:
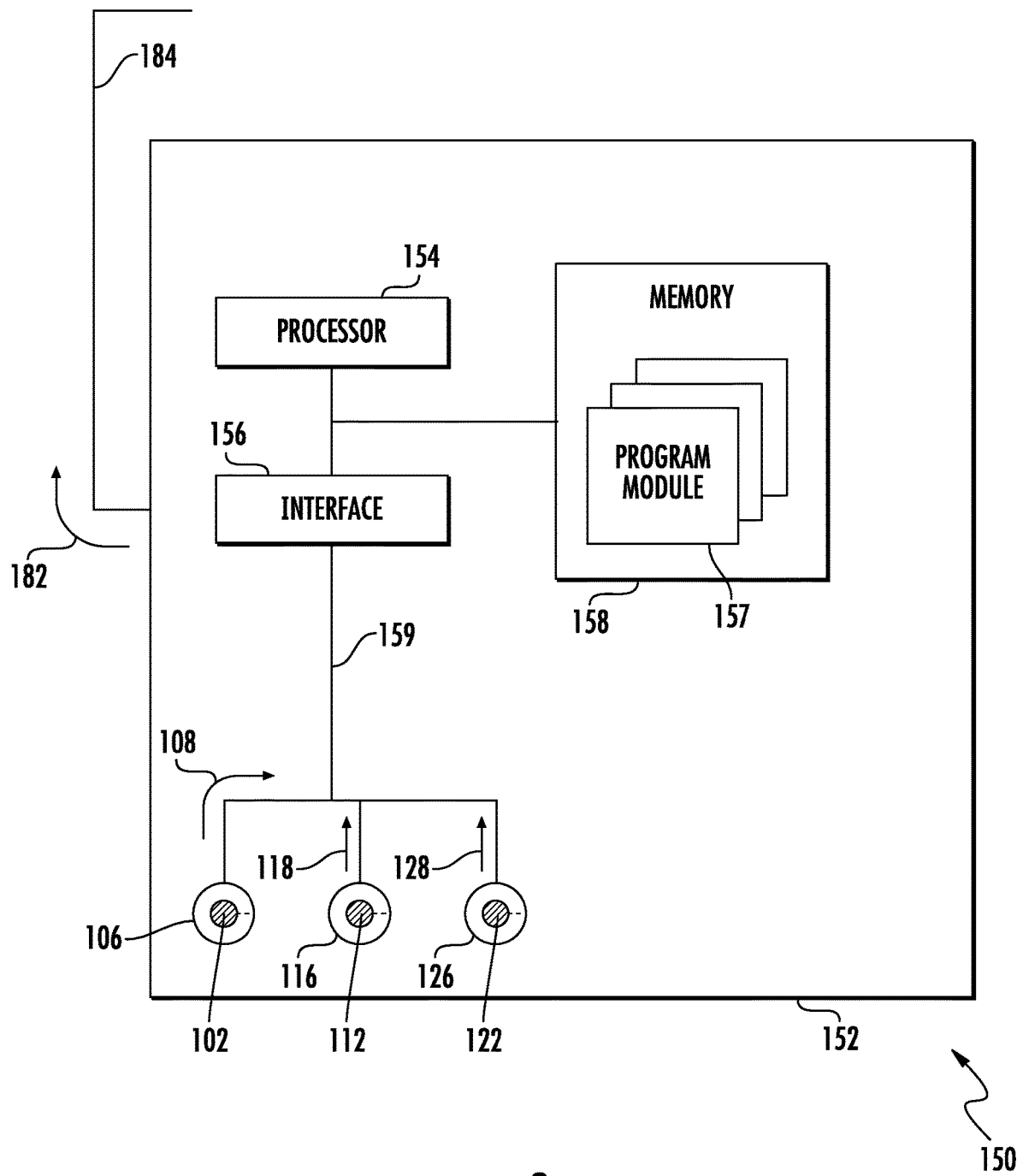
FIG. 3 is a schematic view of the motor controller of FIG. 2, showing current sensors inductively coupled to windings of the electric machine providing signals of current flow through parallel phase windings of the electric machine within the motor controller.

With reference to FIG. 3 as well, the motor controller 150 is shown. The motor controller 150 includes a housing 152, a processor 154, an interface 156, a memory 158, and a communications link 159. Each of the phase leads 102, 112, and 122 extend from the first and second switching devices 160, 162 (FIG. 2) into an interior of the housing 152, where they electrically connect with the inverter 130 (FIG. 2). The current sensors 106, 116, and 126 inductively couple to each of the phase leads 102, 112, 122 respectively within in the interior of the housing 152 for providing signals indicative of a current flow through each phase lead 102, 112, and 122. In this respect, the A-phase current sensor 106 inductively couples to the A-phase lead 102, the B-phase current sensor 116 inductively couples to the B-phase lead 112, and the C-phase combined current sensor 126 inductively couples to the C-phase lead 122.

Each of the current sensors 106, 116, and 126 provides a phase current signal 108, 118, 128 indicative of a respective current flow to communications link 159. In this respect, the A-phase current sensor 106 reports current flow through the A-phase lead 102 via a A-phase current signal 108, which is provided to communications link 159. Similarly, the B-phase current sensor 116 reports current flow through the B-phase lead 112 via a B-phase current signal 118, which is also provided to the communications link 159. Finally, the C-phase current sensor 126 reports a current flow through the C-phase lead 122 via a C-phase current signal 128, which is additionally provided to the communications link 159.

In some embodiments, communications link 159 provides the respective current signals 108, 118, 128, to the processor 154 via the interface 156. The processor 154 is disposed in communication with the interface 156 and the memory 158. The memory 158 has a plurality of program modules 157 recorded thereon that, when read by the processor 154, cause the processor 154 to execute certain operations, e.g., determine motor currents, inverter voltages stresses, and the like. In this respect the processor 154 receives the A-phase current signal 108, the B-phase current signal 118, and the C-phase current signal 128 and evaluates the currents and commanded voltages from the inverter 130 and determines health status of motor 100 (shown in FIG. 2). In an embodiment, the motor controller 150 executing one or methods as described herein may determine that the stress on one or more of the motor windings 104, 114, 124 has reached a selected threshold and therefore commands the switching devices 160, 162 via command signals 165 and 166 respectively to change state. In an embodiment, one or more selected thresholds may be employed and may be recorded on memory 158 by way of non-limiting example. In other embodiments, the stress may be estimated by simple durations and estimating the operating time for the motor 100 in configuration versus the other. For example, because the first few turns of a motor winding are particularly vulnerable to cumulative degrading effects due to dV/dt exposure, a flow process as described with respect to FIG. 4 with alternating duty times (e.g. outbound missions vs. inbound missions) is employed. In this manner, dergrading effects of dV/dt exposure to the first few turns is effectively distributed within the motor 100 to reduce the local cumulative damage by half as compared to a conventional motor and drive system applying inverter signals to only one end of the motor 100. In another embodiment, a simple timer may be employed, that is, the motor is operated in the first configuration with switching device 160 deenergized and switching device 162 energized. In this configuration the inverter signals are applied to the first ends 105, 115, 125 of the motor windings 104, 114, 124 respectively, and thereby the first ends 105, 115, 125 of the motor windings 104, 114, 124 are bearing the stresses of the applied dv/dt from the command signals from the inverter 130 of the motor controller 150. After a selected duration, the motor controller 150 may change the state of the command signals 165, 166 to the first switching device 160 and second switching device 162, causing the switching devices 160, 162 to change to the opposite state. That is, in the second instance, the motor 100 is operated in the second configuration with switching device 160 energized and switching device 162 de-energized. In this configuration the inverter signals are applied to the second ends 107, 117, 127 of the motor windings 104, 114, 124 respectively, and thereby the second ends 107, 117, 127 of the motor windings 104, 114, 124 are bearing the stresses of the applied dv/dt from the command signals from the inverter 130 of the motor controller 150.

In another embodiment, a health status report, and or warning report 184, may be generated and issued by processor 162 via a communications link 182 to an electrical system manager, aircraft control system, identifying to the maintenance personnel and the like, regarding the status of the motor 100. Countermeasures can also be taken, such as replacement of the motor 100 based on the switching states, or timing to reduce high dV/dt instances, current flow through the impacted windings 104, 114, 124, and the like, and thereby potentially avoiding any downtime due to the motor 100.

Figure 4:
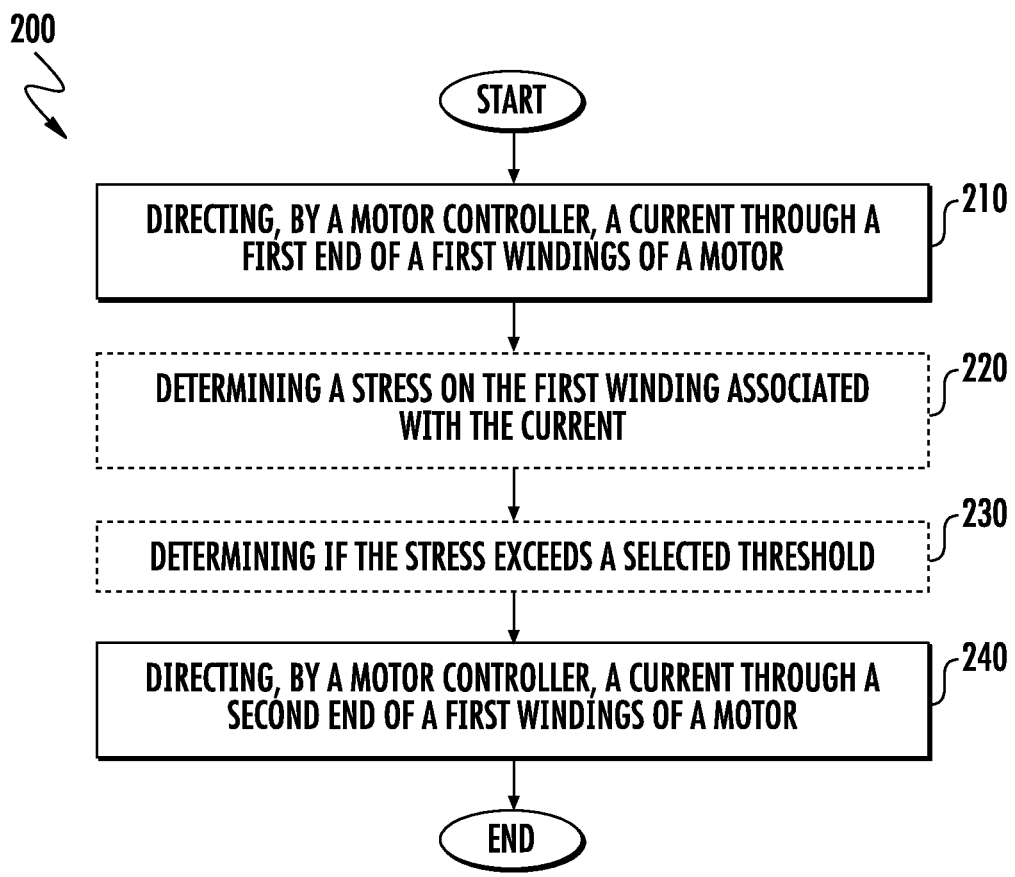
FIG. 4 is a process flow chart of a method for extending the insulation life of a machine by distributing the cumulative damage associated with dV/dt exposure, showing steps of the method in accordance with an embodiment.

With reference to FIG. 4, a method 200 of winding life extension for inverter driven motors in accordance with an embodiment is shown. Method 200 includes flowing a current to a first winding 104 via a first end 105 of the motor winding 104, e.g., A-phase winding 104 (shown in FIG. 2) as depicted with process step 210. After a predetermined duration, flowing a current to the first winding 104, e.g., A-phase winding 104 (shown in FIG. 2) via a second end 107 of the motor winding 104 as depicted with process step 240. In an embodiment the predetermined duration may be elapsed time, mission profile, functionality, and the like. In one embodiment, the predetermined time may be based on mission profiles such as outbound and inbound missions. For example, with flowing current to a first winding 104 via a first end 105 of the motor winding 104, during an outbound mission and then, flowing a current to the first winding 104, e.g., A-phase winding 104 (shown in FIG. 2) via a second end 107 of the motor winding 104 during an inbound portion of the mission. In another embodiment, with flowing current to a first winding 104 via a first end 105 of the motor winding 104, on a first day and then, flowing a current to the first winding 104, e.g., A-phase winding 104 (shown in FIG. 2) via a second end 107 of the motor winding 104 on a subsequent day.

In another embodiment, optionally, based on the applied current from the inverter 130 and the applied dv/dt, and a duration associated with the applied current, determining a stress on the first winding 104 associated with the current as shown at process step 220. The method 200 continues at process step 230 with determining if the stress, including but not limited to a dV/dt, a duration, and the like exceeds a selected threshold. In an embodiment, the threshold is about 100 volts/microsecond. In another embodiment the threshold is about 500 volts/microsecond. In another embodiment the threshold is based on a duration of time, such as a mission, flight duration. In yet another embodiment the threshold duration is daily. Finally, if the stress as computed by the motor controller 150 exceeds the selected threshold, flowing a current to the first winding 104, e.g., A-phase winding 104 (shown in FIG. 2) via a second end 107 of the motor winding 104 as depicted with process step 240.

Continuing with FIG. 4, in an embodiment, optionally the process may continue with further monitoring the stress on the motor winding 104 based on the directing of current of process step 240. If the stress on the motor winding 104 based on step 240 exceeds another selected threshold, the process reiterates.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric motor control system, comprising:
   an electric motor having a first winding with a first end and a second end;
   a motor controller having a first phase lead corresponding to the first winding of the electric motor, the motor controller operable to direct a phase current to the first phase lead;
   a first switching device operably connected to the motor controller and providing an electrical connection between the first phase lead and the first end of the first winding when in a disabled state, and thereby flowing the phase current from the first phase lead to the first end of the first winding; and
   a second switching device operably connected to the motor controller and providing an electrical connection between the second end of the first winding and a second common point of the second switching device when in an enabled state,
   wherein the motor controller is operable to change the state of the first switching device to the enabled state and change the state of the second switching device to the disabled state under selected conditions,
   wherein the motor comprises a second winding having a first end and a second end, wherein the first winding and the second winding remain in a parallel configuration when alternatively connected to a first common point of the first switching device and the second common point.

2. The electric motor control system of claim 1, wherein the first switching device provides an electrical connection between the first end of the first winding and the first common point when in the enabled state; and
   the second switching device and provides an electrical connection between the second end of the first winding and the first phase lead when in the disabled state, and thereby flowing the phase current from the first phase lead to the second end of the first winding.

3. The electric motor control system of claim 1, further including the electric motor is a multiphase electric machine and the phase lead corresponds to a first phase of a plurality of phases.

4. The electric motor control system of claim 1, wherein the motor controller has a second phase lead corresponding to a second phase of the plurality of phases, the second phase lead operable to carry a second phase current.

5. The electric motor control system of claim 1, wherein:
   the first switching device provides an electrical connection between the second phase lead and the first end of the second winding when in the disabled state, and thereby flowing the phase current from the second phase lead to the second end of the first winding, and the second switching device providing an electrical connection between the second end of the second winding and the second common point when in the enabled state; and
   the first switching device provides an electrical connection between the first end of the second winding and the first common point when in a enabled state; and
   the second switching device provides an electrical connection between the second end of the second winding and the second phase lead when in the disabled state, and thereby flowing the phase current from the second phase lead to the second end of the second winding.

6. The electric motor control system of claim 1, wherein the motor controller includes an inverter.

7. The electric motor control system of claim 1, wherein at least one of the first switching device and the second switching device is a multipole-double throw relay or contactor.

8. The electric motor control system of claim 1, further including a first current sensor operably connected to the first phase lead, the current sensor operable to measure the first phase current.

9. The electric motor control system of claim 1, wherein the selected conditions include stress on the first motor winding.

10. The electric motor control system of claim 1, wherein a determined stress on the first motor winding is based on at least one of: a mission profile, a duration of time, the phase current, a voltage applied to the first winding, a dv/dt of the voltage applied to the first winding, a dv/dt over time, and a voltage in an inverter of the motor controller.

11. A method extending winding life in an electric motor driven by an inverter, the method comprising:
   directing, by a motor controller, a first phase current through a first end of a first winding of the electric motor, and connecting a second end of the first winding to a second common point of a second switching device;
   redirecting, by the motor controller, the first phase current through the second end of the first winding of the electric motor and connecting the first end of the first winding to a first common point of a first switching device, under selected conditions,
   wherein the electric motor comprising a second winding having a first end and a second end, wherein the first winding and the second winding remain in a parallel configuration when alternatively connected to the first common point and the second common point.

12. The method of extending winding life of claim 11, further including the electric motor is a multiphase electric machine and the phase lead corresponds to a first phase of a plurality of phases.

13. The method of extending winding life of claim 11, further including directing, by the motor controller, a second phase current through the first end of the second winding of the electric motor, and connecting the second end of the second winding to the second common point.

14. The method of extending winding life of claim 13, further including directing, by the motor controller, the second phase current through the second end of the second winding of the electric motor and connecting the first end of the second winding to the first common point if a determined stress determined exceeds the first selected threshold.

15. The method of extending winding life of claim 11, further including measuring the first phase current with a first current sensor operably connected to the first phase lead, the current sensor operable to provide a first phase current signal to the motor controller.

16. The method of extending winding life of claim 11, wherein the selected conditions include a stress on the first winding of the motor.

17. The method of extending winding life of claim 16, wherein the stress is based on the duration in the phase current is applied to the first winding.

18. The method of extending winding life of claim 11, further including:
   determining a stress on the first winding associated with the first phase current; and
   determining if the stress exceeds a first selected threshold, wherein the redirecting is based on the stress exceeding the selected threshold.

19. The method of extending winding life of claim 11, wherein a determined stress on the first motor winding is based on at least one of: a mission profile, a duration of time, the phase current, a voltage applied to the first winding, a dv/dt of the voltage applied to the first winding, a dv/dt over time, and a voltage in the inverter of the motor controller.

* * * * *